(12) United States Patent
Ilchenko et al.

(10) Patent No.: US 12,228,450 B2
(45) Date of Patent: Feb. 18, 2025

(54) APPARATUS FOR CARRYING OUT POLARIZATION RESOLVED RAMAN SPECTROSCOPY

(71) Applicants: Danmarks Tekniske Universitet, Kongens Lyngby (DK); Xnovo Technology ApS, Køge (DK)

(72) Inventors: Oleksii Ilchenko, Kongens Lyngby (DK); Anja Boisen, Kongens Lyngby (DK); Yurii Pilhun, Kongens Lyngby (DK); Andrii Kutsyk, Kongens Lyngby (DK); Florian Bachmann, Køge (DK)

(73) Assignee: Danmarks Tekniske Universitet; Xnovo Technology ApS, Køge (DK)

( * ) Notice: Subject to any disclaimer, the term of this patent is extended or adjusted under 35 U.S.C. 154(b) by 203 days.

(21) Appl. No.: 17/756,594

(22) PCT Filed: Dec. 4, 2020

(86) PCT No.: PCT/EP2020/084700
§ 371 (c)(1),
(2) Date: May 27, 2022

(87) PCT Pub. No.: WO2021/110949
PCT Pub. Date: Jun. 10, 2021

(65) Prior Publication Data
US 2023/0003576 A1    Jan. 5, 2023

(30) Foreign Application Priority Data

Dec. 4, 2019 (EP) .................................... 19213597
Dec. 4, 2019 (EP) .................................... 19213599

(51) Int. Cl.
*G01J 3/02* (2006.01)
*G01J 3/28* (2006.01)
(Continued)

(52) U.S. Cl.
CPC .......... *G01J 3/0224* (2013.01); *G01J 3/0208* (2013.01); *G01J 3/2803* (2013.01); *G01J 3/44* (2013.01);
(Continued)

(58) Field of Classification Search
CPC ...... G01J 3/0208; G01J 3/0224; G01J 3/2803; G01J 3/44; G01N 2021/216; G01N 2021/4792; G01N 21/65
See application file for complete search history.

(56) References Cited

U.S. PATENT DOCUMENTS

2022/0228991 A1* 7/2022 Finnie .................... G01N 21/65
2023/0039380 A1* 2/2023 Perston .................... G01J 3/28

FOREIGN PATENT DOCUMENTS

CN    110 231 092 A    9/2019
WO    03/089890 A1    10/2003

OTHER PUBLICATIONS

European Search Report issued for European Patent Application No. 19 21 3599, dated May 18, 2020 in 12 pages.
(Continued)

*Primary Examiner* — Hina F Ayub
(74) *Attorney, Agent, or Firm* — Knobbe, Martens, Olson & Bear, LLP

(57) ABSTRACT

An apparatus for carrying out polarization resolved Raman spectroscopy on a sample (11), in particular a crystalline or polycrystalline sample, the apparatus comprises:
  at least one light source (13, 87, 93, 95, 97), in particular at least one laser, for providing excitation radiation to a surface of the sample (11),
  an optical system which is configured to simultaneously collect at least one on-axis Raman beam (21, 109) and at least one off-axis Raman beam (23, 111) from Raman
(Continued)

light scattered by the sample (11) in response to exposing the surface to the excitation radiation, the at least one on-axis Raman beam (21, 109) being scattered from the sample (11) in a direction that is aligned with an optical axis of an objective (41) of the optical system for collecting the at least one on-axis Raman beam (21, 109), the at least one off-axis Raman beam being scattered from the sample in a direction that is inclined with regard to an optical axis of an objective (41) of the optical system for collecting the at least one off-axis Raman beam (23, 111), the optical system comprises at least one polarizer device (25, 113) for generating at least one polarized on-axis Raman beam (31, 33) from the at least one on-axis Raman beam (21, 109) and at least one polarized off-axis Raman beam (35) from the at least one off-axis Raman beam (23, 111), and the optical system comprises at least one spectrometer (37, 47 81, 83, 85) for generating, in particular simultaneously, an optical spectrum from each of the at least one polarized on-axis Raman beam (31, 33) and the at least one polarized off-axis Raman beam (35).

13 Claims, 8 Drawing Sheets

(51) Int. Cl.
*G01J 3/44* (2006.01)
*G01N 21/21* (2006.01)
*G01N 21/65* (2006.01)

(52) U.S. Cl.
CPC ....... *G01N 21/65* (2013.01); *G01N 2021/216* (2013.01)

(56) References Cited

OTHER PUBLICATIONS

International Search Report issued for International Patent Application No. PCT/EP2020/084700, mailed Feb. 9, 2021 in 4 pages.
Loechelt et al., "Polorized Off-Axis Raman Spectroscopy: A Technique for Measuring Stress Tensors in Semiconductors"; Journal of Applied Physics, American Institute of Physics, vol. 86, No. 11, pp. 6164-6180, Dec. 1, 1999.
Margueron et al., "Mapping Domain Walls of PPLN by Dark Field Polarized Raman Spectrometry"; Applications of Ferroelectrics, ISAF 2007. Sixteenth IEEE International Symposium, pp. 350-352, May 1, 2007.
Massbrucker et al., "Determination of Local Crystal Orientation of Diamond Using Polarized Raman Spectra"; Diamond and Related Materials, Elsevier Science Publishers, Amsterdam, NL, vol. 5, No. 11, pp. 1333-1343, Nov. 1, 1996.
Munisso et al., "Raman Tensor Analysis of Sapphire Single Crystal and Its Application to Define Crystallographic Orientation in Polycrystalline Alumina"; Physica Status Solidi. B, Basic Research., vol. 246, No. 8, pp. 1893-1900, Aug. 1, 2009.
Ramabadran et al., "Intensity Analysis of Polarized Raman Spectra for off Axis Single Crystal Silicon"; Materials Science & Engineering B, Elsevier, pp. 31-42 (2018).
Perreault, "Triple Wollaston-Prism Complete-Strokes Imaging Polarimeter"; Optics Letters, Optical Society of America, vol. 38, No. 19, pp. 3874-3877, Oct. 1, 2013.

\* cited by examiner

APPARATUS FOR CARRYING OUT POLARIZATION RESOLVED RAMAN SPECTROSCOPY

CROSS-REFERENCE TO RELATED APPLICATIONS

The present application is the U.S. National Phase under 35. U.S.C. § 371 of International Application PCT/EP2020/084700, filed Dec. 4, 2020, which claims the priority of European patent application no. 19213599.4 and the priority of European patent application no. 19213597.8, the disclosure of both documents is incorporated herein by reference.

FIELD OF THE INVENTION

Background of the Invention

The present invention relates to an apparatus and to a method for carrying out polarization resolved Raman spectroscopy on a sample, in particular a crystalline or polycrystalline sample.

Spectroscopy generally refers to the process of measuring energy or intensity as a function of wavelength in a beam of light. Spectroscopy uses absorption, emission, or scattering of light by physical matter, in particular atoms, molecules or ions, to qualitatively and quantitatively study physical properties and processes of matter.

Light or radiation directed at a sample during operation of a spectrometer system may be referred to as incident radiation. Redirection of incident radiation following contact with the sample is commonly referred to as scattering of radiation. To the extent that atoms or molecules in a sample absorb all or a portion of the incident radiation, rather than reflect incident radiation, a sample may become excited, and the energy level of the sample may be increased to a higher energy level. Light may be scattered but may continue to have the same wavelength as the incident radiation, a condition commonly referred to as Rayleigh or elastically scattered light. Incident radiation that is scattered by the sample during, for example, a change of vibrational state in molecules may be scattered with a different energy, and such scattered light may be called Raman scattered light. Such phenomena have been used in conjunction with spectroscopy to qualitatively and quantitatively study physical properties and processes, including identification of chemical properties, compositions, and structures of samples.

If incident radiation is directed at a sample, the wavelength of the incident radiation may remain substantially unchanged in scattered radiation. Alternatively, if incident radiation is directed at a sample, the wavelength in the scattered radiation may acquire one or more different wavelengths than the incident wavelength. The energy differential between the incident radiation and the scattered radiation may be referred to as a Raman shift. Spectroscopic measurement of Raman scattered light may seek to measure the resulting wavelengths of such scattered light.

The phenomenon of Raman scattered light is useful in spectroscopy applications for studying qualities and quantities of physical properties and processes, including identification of chemical properties, compositions, and structure in a sample. Raman shift spectroscopic analytical techniques are used for qualitative and quantitative studies of samples. If incident radiation is used to scatter light from a sample, and scattered radiation data is measured, the scattered radiation may provide one or more frequencies associated with the sample, as well as the intensities of those shifted frequencies. The frequencies may be used to identify the chemical composition of a sample.

Raman spectrometers are an example of spectrometers for measuring inelastically scattered light and they are commonly used for obtaining a Raman spectrum of a sample. When a sample is irradiated with monochromatic light, for example from a laser, the light scattered by the sample will contain wavelength components different from those present in the incident light. The so-called Raman scattering of light on molecules present in the sample usually creates this effect. In a Raman spectrometer, the light scattered by the sample is collected and the spectral distribution of the wavelength components having a wavelength different from that of the light source is detected, e.g. in form of a digital image.

In some measurements of Raman spectra, it may be desired to obtain information about the polarization of the Raman scattered light. For example, polarization dependent characteristics of Raman scattering are dependent on single crystalline quality and crystallographic orientation of a substrate, consisting of, for example, a single crystalline silicon (Si) wafer. Ramabadran et al. describe in the scientific publication: "Intensity analysis of polarized Raman spectra for off axis single crystal silicon", Materials Science & Engineering B 230, p. 31-42, 2018 that polarized back-scattered Raman spectroscopy can be used for identifying the crystallographic orientation of silicon cut off axis.

Munisso et al. propose in the scientific publication "Raman tensor analysis of sapphire single crystal and its application to define crystallographic orientation in polycrystalline alumina", Phys. Status Solidi B 246, No. 8, 1893-1900 (2009) a tensorial algorithm for the practical determination of unknown crystallographic textures in polycrystalline alumina materials.

WO 03/089890 A1 discloses an imaging spectrometer that comprises a polarising beam splitter, such as a Wollaston prism.

SUMMARY OF THE INVENTION

It is an objective of the present invention to provide efficient means for carrying out polarization resolved spectroscopy on a sample, in particular a crystalline or polycrystalline sample.

The objective is satisfied by an apparatus in accordance with the features of claim 1. Preferred embodiments of the present invention are described in the dependent claims.

An apparatus for carrying out polarization resolved Raman spectroscopy on a sample, in particular a crystalline or polycrystalline sample, comprises at least one light source, in particular at least one laser, for providing excitation radiation to a surface of the sample, an optical system which is configured to collect at least one off-axis Raman beam from Raman light scattered by the sample in response to exposing the surface of the sample to the excitation radiation, the at least one off-axis Raman beam being scattered from the sample in a direction that is inclined with regard to an optical axis of an objective, which is configured to collect the at least one off-axis Raman beam, wherein the optical system further comprises at least one polarizer device for generating at least one polarized off-axis Raman beam from the collected at least one off-axis Raman beam, and wherein the optical system further comprises at least one spectrometer for generating an optical spectrum from the at least one polarized off-axis Raman beam.

In some embodiments, the optical system is configured to simultaneously collect at least one on-axis Raman beam in addition to the at least one off-axis Raman beam, wherein the at least one on-axis Raman beam is scattered from the sample in a direction that is aligned with an optical axis of an objective of the optical system, which is configured to collect the at least one on-axis Raman beam. Furthermore, the at least one polarizer device is configured to generate at least one polarized on-axis Raman beam from the at least one on-axis Raman beam. Moreover, the at least one spectrometer is configured to generate, in particular simultaneously, an optical spectrum from each of the at least one polarized on-axis Raman beam and the at least one polarized off-axis Raman beam.

At least in some embodiment, an apparatus for carrying out polarization resolved Raman spectroscopy on a sample, in particular a crystalline or polycrystalline sample, comprises at least one light source, in particular at least one laser, for providing excitation radiation to a surface of the sample, an optical system which is configured to simultaneously collect, from Raman light scattered by the sample in response to exposing the surface to the excitation radiation, at least one on-axis Raman beam and at least one off-axis Raman beam, the at least one on-axis Raman beam being scattered from the sample in a direction that is aligned with an optical axis of an objective of the optical system for collecting the at least one on-axis Raman beam, the at least one off-axis Raman beam being scattered from the sample in a direction that is inclined with regard to an optical axis of an objective of the optical system for collecting the at least one on-axis Raman beam, the optical system comprising at least one polarizer device for generating at least one polarized on-axis Raman beam from the at least one on-axis Raman beam and at least one polarized off-axis Raman beam from the at least one off-axis Raman beam, and the optical system comprising at least one spectrometer for generating an optical spectrum from each of the at least one polarized on-axis Raman beam and the at least one polarized off-axis Raman beam.

The optical spectra obtained from the optional polarized on-axis and the off-axis Raman beams can be used to carry out a two-dimensional (2D) or three-dimensional (3D) non-destructive orientation mapping of the surface (2D) or volume (3D) of the sample. In particular, if the sample is a crystalline or polycrystalline sample, orientation mapping of the grains can be carried out. A polycrystalline material is composed of a large number of grains, which are also called crystallites.

Instead of obtaining one or more polarized on-axis Raman beams from collected on-axis Raman beams, some embodiments can make use of only one or more polarized off-axis Raman beams obtained from only collecting off-axis Raman beams. In some embodiments, off-axis Raman beams and/or on-axis Raman beams can be collected simultaneously and the optical spectra of at least some of the corresponding polarized on-axis and/or off-axis Raman beams can be detected simultaneously.

Orientation mapping can provide spatially resolved information about the position, size, morphology, and crystallographic orientation for each grain of a polycrystalline sample, as well as information about the topological connectivity between the grains can be obtained, with a diffraction-limited spatial resolution of around 200 nm. Thus, the apparatus in accordance with the present invention can also be used to obtain crystallographic information of a sample. In 3D orientation mapping, the volume has a very small thickness due to the short penetration depth of the light into the sample.

In theory, if the symmetry group of the crystal is known, Raman tensors for crystal modes can be obtained and intensities of the Raman signals versus sample rotation angle can be simulated. Correlation between theoretical and experimental angular intensity dependencies can be used for the determination of the local crystallographic orientation. Polarized Raman experiments have so far been carried out by rotating the sample or rotating a set of wave plates in the incident laser or on scattered beams in the Raman setup.

However, the apparatus in accordance with the present invention allows for polarized Raman spectroscopy with simultaneous registration of Raman spectra from at least one polarized on-axis Raman beam and at least one polarized off-axis Raman beam or from only polarized off-axis Raman beams, which allows avoiding ambiguities in the determination of crystallographic orientation, for example parameterized by proper Euler angles, while the orientation of the sample is not changed. Thus, it is not required to rotate the sample.

The apparatus in accordance with the present invention can in particular be used to carry out the simultaneous registration of multiple Raman scattering spectra obtained at different polarization and an ambiguity free orientation determination data analysis that allows for 2D and 3D quantitative orientation mapping of polycrystalline materials. A sub-micrometer resolution, fast data acquisition and an orientation determination at high angular accuracy and precision can be achieved.

The optical system can be configured to simultaneously collect at least one on-axis Raman beam and at least one off-axis Raman beam from Raman light scattered by the sample in response to exposing the surface to the excitation radiation. The sample scatters the light without any preferential direction. Thus, when collecting the Raman beams, for example by use of an objective of the apparatus, the on-axis beams and off-axis beams might not yet be separated from each other. The collected light might pass, for example, through a mask with pinholes that separates the at least one off-axis beam from the at least one on-axis beam. The mask might for example comprise a plate with at least two pinholes. One pinhole might be aligned with the optical axis of the optical system, while the other pinhole is offset from the optical axis in a radial direction with regard to the optical axis.

The at least one light source might provide one or more laser beams to the sample. The laser beams might be polarized on their path to the sample.

In some embodiments, the at least one off-axis Raman beam travels—at least for some travel distance in the optical system—along a propagation direction in the optical system that is offset in a radial direction from the optical axis, in particular the central optical axis of the polarizer device. The central optical axis is in particular the optical axis defined by a central polarization sensitive element, which can be a Wollaston prism.

The off-axis Raman beam can travel through an optical element that acts on the off-axis Raman beam in such a way that the off-axis Raman beam travels off-axis with regard to the optical axis of the optical system, in particular the central optical axis of the polarizer device. For example, a polarization analyzer may be placed off-axis with respect to the optical axis and the off-axis Raman beam may pass through this polarization analyzer. The polarization analyzer can filter out the component of the off-axis Raman beam that has a specific polarization, while the component with the orthogonal polarization is blocked.

The propagation direction of the off-axis Raman beam can be parallel to the optical axis, for example the central optical axis of the polarizer device, for at least a portion of the travel distance of the off-axis Raman beam. The off-axis Raman beam and the on-axis Raman beam might travel, at least for a portion of the travel distance, in parallel to each other. This might in particular be true for the travel distance through the polarizer device.

The optical axis of the optical system may correspond to the optical axis of the objective, which is used to collect the Raman light. If more than one objective is used to collect the Raman light, the optical axis of the optical system can be defined by the optical axis of a first objective used to collect the at least one on-axis Raman beam. This optical axis might extend through the optical system and the optical axis of the objective might be regarded as optical axis of the optical system.

When the optical axis of the objective is considered as optical axis of the optical system, this optical axis can have turns, so the optical axis does not have to be a straight line throughout the optical system. Moreover, the optical axis can be regarded as axis along which the optical components of the optical system are aligned. Moreover, the optical components can be centered with respect to the optical axis.

The optical system can comprise an objective for collecting both, the at least one on-axis Raman beam and the at least one off-axis Raman beam. The objective can be aligned with regard to the optical axis. The objective can also define the optical axis of the optical system. Other components of the optical system, in particular for the optical system for handling the Raman beams, can be aligned with respect to the optical axis as defined by the objective. Using a single objective allows setting up a compact optical system for collecting the Raman beams. The objective preferably comprises a high numerical aperture (NA) to be able to collect at least one off-axis Raman beam, which originates from Raman light that is scattered from the sample at a large angle, for example 45°, with respect to the optical axis.

The optical system might comprise a first objective for collecting the at least one on-axis Raman beam and at least a second objective for collecting the at least one off-axis Raman beam. Using a separate, second objective for collecting the at least one off-axis Raman beam provides as an advantage that the off-axis Raman beam can be obtained from Raman light that is scattered at a large angle from the sample. For example, the second objective may be arranged such that Raman light can be collected that leaves the sample at angles up to nearly 90° with respect to the optical axis of the optical system. The optical axis of the optical system is preferably defined by the first objective.

The optical system and in particular the polarizer device can comprise a central polarization sensitive element comprising a central polarizing beam splitter, in particular a Wollaston prism, and/or an analyzer. The optical axis of the central polarization sensitive element can coincide with the optical axis of the optical system. Thus, the optical axis of the central polarization sensitive element can be aligned with the optical axis of the optical system. The central polarization sensitive element can thus be centered with regard to the optical axis.

The central polarizing beam splitter might be arranged such that the at least one on-axis Raman beam passes through the central polarizing beam splitter which splits the on-axis Raman beam into two polarized on-axis Raman beams, each of which has a defined polarization. Thus, the central polarization sensitive element can act on the at least one on-axis Raman beam. For example, a Wollaston prism of the central polarization sensitive element can generate two orthogonally polarized on-axis Raman beams per collected on-axis Raman beam.

The optical system and in particular the polarizer device can comprise at least one peripheral polarization sensitive element comprising a peripheral polarizing beam splitter, in particular a Wollaston prism, and/or an analyzer, and the optical axis of the peripheral polarization sensitive element can be arranged in a radial direction at a distance and in parallel to the optical axis of the optical system.

In some embodiments, the peripheral polarizing beam splitter can be arranged such that the at least one off-axis Raman beam passes through the peripheral polarizing beam splitter which splits the off-axis Raman beam into two polarized off-axis Raman beams, each of which has a defined polarization.

In some embodiments, a polarization analyzer of the peripheral polarization sensitive element can generate one polarized, preferably linearly polarized, off-axis Raman beam per off-axis Raman beam.

The optical system can comprise at least one mask. The mask can comprise a plate that is placed into the paths of the Raman beams. The plate can provide a pinhole for each Raman beam, in particular for each of the on-axis and off-axis Raman beams.

The spectrometer can comprise an optical diffraction grating for dividing each polarized Raman beam, in particular each polarized on-axis Raman beam and each polarized off-axis Raman beam, into an optical spectrum of spatially separated wavelength components. The spectrometer can comprise a focusing lens system for directing at least a portion of each spectrum to a detector, in particular a two-dimensional array detector, such as a two-dimensional CCD detector.

The grating can be a transmission grating.

In some embodiments, the polarizer device, in particular the central polarization sensitive element and/or the peripheral polarization sensitive element, is arranged in a spectrometer of the optical system, in particular between a collimating lens system and an optical diffraction grating of the spectrometer. The collimating lens system can ensure that the on-axis and off-axis Raman beams travel as collimated beams through the central polarization sensitive element and the peripheral polarization sensitive element, respectively.

In some embodiments, the polarizer device, in particular the central polarization sensitive element and/or the peripheral polarization sensitive element, can be arranged between an objective and an entrance slit of a spectrometer of the optical system. Thus, the central polarization sensitive element and/or the peripheral polarization sensitive element can be arranged before the spectrometer.

A laser beam delivery optical system can be configured to provide polarized laser beams, preferably three laser beams, to the sample. The laser beams might be generated by use of the at least one laser. Preferably, each laser provides laser light at a defined wavelength.

Preferably, for carrying out 2D orientation mapping, a single laser is employed. The laser provides laser light at a defined wavelength, for example 785 nm. Preferably, the laser emits laser light at a wavelength in the blue, green or red color regime. As an example, the laser can emit green light at 532 nm.

The laser beam delivery optical system can comprise optical elements for generating three laser beams, each of which has a defined polarization, from the laser light provided by the single laser. Preferably, the three laser beams have different polarizations. The laser beam delivery optical system can further include optical elements to guide the polarized laser beams to the sample.

Preferably, the three laser beams are focused on the surface of the sample to spatially separated spots. The objective to collect the at least one on-axis Raman beam and/or the at least one off-axis beam is preferably employed for focusing the laser beams on the sample.

As three laser beams are focused on the sample surface, three on-axis Raman beams and three off-axis Raman beams can be collected, each originating from one of the three incident laser beams. Splitting for example each of the three-on axis Raman beams by use of a Wollaston prism into two orthogonally polarized on-axis Raman beams results in six polarized on-axis Raman beams. Thus, six Raman spectra from the six polarized on-axis Raman beams can be detected. Moreover, using, for example, a polarization analyzer for generating a polarized off-axis Raman beam from each of the three off-axis Raman beams results in three polarized off-axis Raman beams. Thus, three Raman spectra from the three polarized off-axis Raman beams can be detected. Hence, six on-axis channels and three off-axis channels for the detection of Raman spectra are provided by the described example configuration.

Preferably, for carrying out 3D orientation mapping, three lasers are employed. The laser provide laser light at different wavelengths, for example a first laser provides laser light at 781 nm, a second laser provides laser light at 783 nm, and a third laser provides laser light at 785 nm.

The laser beam delivery optical system can comprise optical elements for generating three laser beams, each of which has a defined polarization, from the laser light provided by the three lasers. Preferably, the three laser beams have different polarizations. The laser beam delivery optical system can further include optical elements to guide the polarized laser beams to the sample.

Preferably, the three laser beams are focused on the surface of the sample to spots, which can spatially overlap. The detected Raman spectra can be locally separated from each on the detector array due to the difference in wavelength of the incident laser beams.

The objective to collect the at least one on-axis Raman beam and/or the at least one off-axis beam is preferably employed for focusing the laser beams on the sample.

The detected Raman spectra, in particular their intensity as a function of wavelength and polarization can be employed for orientation mapping.

The apparatus can comprise a scanning stage for holding the sample. The stage can be moveable in a plane, which may be perpendicular to the optical axis of the optical system. The plane can be regarded as xy-plane. The scanning stage can be configured to move the sample such as to avoid a rotation of the sample. Hence, the sample does not rotate during the Raman measurements. The scanning stage allows raster scanning of the surface of the sample.

The scanning stage could also be moveable in a direction that is parallel to the optical axis of the optical system. Thus, the scanning stage could be moveable in a z-direction perpendicular to the xy-plane. This can be advantageous for focusing and volumetric scanning.

The invention also relates to device, in particular a polarizer device, preferably for use in an apparatus in accordance with the present invention, the device comprises:

a central polarization sensitive element comprising a central polarizing beam splitter, in particular a Wollaston prism, and/or an analyzer, at least one peripheral polarization sensitive element comprising a peripheral polarizing beam splitter, in particular a Wollaston prism, and/or an analyzer, and an optical axis of the peripheral polarization sensitive element being arranged in a radial direction at a distance and in parallel to the optical axis of the central polarization sensitive element.

In particular, in some embodiments, the central polarization sensitive element is configured to generate from an incident light beam two linearly polarized light beams having a first and second polarization direction, for example 0° and 90°, and the at least one peripheral polarization sensitive element is configured to generate from an incident light beam two linearly polarized light beams having a third and fourth polarization direction, for example 45° and 135°.

In some embodiments, a given number of peripheral polarization sensitive elements, for example four peripheral polarization sensitive elements, are arranged in a circumferential direction around the central polarization sensitive element. The arrangement of the peripheral polarization sensitive elements can be centered with regard to the optical axis of the central polarization sensitive element.

The intensity of a detected Raman spectrum depends on the polarization of the light incident on the sample, the polarization of the Raman scattered light, and the Raman tensor associated with the investigated crystal structure. Furthermore, a Euler rotation matrix and its inverse can be employed to transform crystal coordinates into coordinates of the laboratory coordinate system. It is possible to obtain a series of equations for an investigated crystal structure and which fully describe the angular dependences of the intensity of the Raman modes. The use of the Raman spectra obtained from on-axis and off-axis beams or from only off-axis beams as provided by the apparatus in accordance with the present invention avoids ambiguities in the determination of Euler angles, that are the three angles for describing the crystallographic orientation of the crystal coordinate system with respect to a fixed coordinate system, such as the laboratory coordinate system or the sample coordinate system, in particular the orientation of the crystal plane with respect to the sample surface. These Euler angles can be obtained from the above-mentioned series of equations for a known crystalline structure from a theoretical calculation and from experiments. Using nine on-axis and off-axis detection channels as described herein of an apparatus in accordance with the present invention allows for example detecting Euler angles with an accuracy of about 1°. A detection channel can be related to a signal from one polarized on-axis or off-axis beam as provided by the detector of the spectrograph.

In some embodiments of a method in accordance with the present invention, an orientation estimation can be made. Thus, the Euler angles related to the orientation of a crystal plane of a sample can be estimated. The estimated Euler angles can be used along with a Raman tensor associated with the crystal structure of the sample to compute expected on-axis and off-axis Raman beam intensities or to compute only off-axis Raman beam intensities. The computed intensities, in particular on-axis and off-axis intensities, can be compared with corresponding measured Raman beam intensities, in particular on-axis and off-axis Raman beam intensities, that were obtained from Raman spectra measured by use of an apparatus in accordance with the present invention.

At least in some experimental measurements, it might occur that the absolute intensities are not know. The detector used to measure simultaneously the Raman spectra may for example not be calibrated so that absolute intensities per wavelength cannot be determined.

In some embodiments of a method in accordance with the present invention, the measured intensities of the on-axis and off-axis beams are normalized, preferably by use of at least one normalization factor.

Furthermore, the Euler angles which are related to the orientation of a surface plane of a sample can be estimated. The estimated Euler angles can be used along with the Raman tensor associated with the crystal structure of the sample to compute expected on-axis and off-axis Raman beam intensities. The computed on-axis and off-axis intensities are also normalized, preferably by use at least one normalization factor.

In some embodiments, each channel is divided by the Euclidian norm obtained from all channel intensities. A channel corresponds to one polarized on-axis or off-axis Raman beam that provides a signal on the detector. Preferably, from each spectrum and thus for each channel, one peak intensity value can be selected, and this peak intensity value can be the "intensity" obtained for the channel. The Euclidian norm of a vector composed of the intensities of all of the measurement channels will be equal to unity. Effectively after such normalization, instead of absolute intensities, it is dealt with a relative intensity of each channel. This normalization is done in each point of a scanning raster independently. Other norms besides Euclidian can possibly be used. In some embodiments, the same normalization is applied to selected groups of channels (instead of all channels).

The computed and afterwards normalized intensities, in particular on-axis and off-axis intensities, called herein also normalized computed on-axis and off-axis intensities, can be compared with the corresponding normalized intensities, in particular on-axis and off-axis Raman beam intensities. Differences between the computed intensities, in particular on-axis and off-axis intensities, and the measured intensities, in particular on-axis and off-axis intensities, can optionally be used to determined correction values, which can be used to correct the estimated Euler angles. Optionally, the described process can be repeated with corrected estimated Euler angles until the differences between the normalized computed intensities, in particular on-axis and off-axis intensities, and the normalized measured intensities, in particular on-axis and off-axis intensities, are zero or at least close to zero in order to obtain Euler angles that describe the orientation of the sample surface of the sample.

In some embodiments, the detected on-axis beams and off-axis beams can be grouped in several groups, with each group having similar intensities in the detected Raman spectra.

A corresponding grouping could be carried out for the computed on-axis and off-axis intensities. A corresponding normalization could be applied to the intensities of each group in order to obtain normalized intensities in each group for the computed on-axis and off-axis intensities and the measured on-axis and off-axis intensities. Differences between the normalized computed on-axis and off-axis intensities and the normalized measured on-axis and off-axis intensities can optionally be used to determine correction values, which can be used to correct the estimated Euler angles.

Furthermore, optionally, the described process can be repeated with corrected estimated Euler angles until the differences between the normalized computed on-axis and off-axis intensities and the normalized measured on-axis and off-axis intensities are zero or at least close to zero in order to obtain Euler angles that describe the orientation of the sample surface of the sample.

In some embodiments of a method in accordance with the present invention, channel intensity correction coefficients are determined for each group of measured channels, wherein each channel corresponds to a detected spectrum from a polarized on-axis or off-axis Raman beam. The channel intensity correction coefficients of a group are then applied to the measured intensities of the Raman spectra of the group to obtained groups with corrected measured intensities of the Raman spectra. Based on the results, an orientation fitting is carried out, for example as outlined above, from which a 2D or 3D orientation map of the sample is obtained.

Furthermore, from Raman tensor theory, in particular by taking account the crystalline structure of the sample, intensities of the Raman spectra in each group can be calculated. The computed intensities of the Raman spectra for each group can be used to obtain normalization factors by taking also account of the intensities of the Raman spectra measured for each group. The normalization factors can be combined or averaged taking account of the measured and calculated data of the complete scanning region and thus over the complete mapping region.

The averaged normalization factors can be used as input for determining the channel intensity correction coefficients for each group. The corrected measured intensities of the Raman spectra could be used to obtain more precise group-specific normalization factors.

The invention also relates to a method of determining Euler angles for a point on a sample, the method comprising
providing estimated Euler angles,
providing at least one measured on-axis intensity and at least one measured off-axis intensity obtained from polarized Raman spectroscopy carried out on the point of the sample, in particularly by use of an apparatus in accordance with the present invention,
calculating at least one on-axis intensity and at least one off-axis intensity, preferably by using a Raman tensor associated with a crystal structure of the sample,
calculating correction values for the estimated Euler angles based on the at least one measured on-axis intensity, the at least one measured off-axis intensity, the at least one calculated on-axis intensity and the at least one calculated off-axis intensity, and
determining corrected Euler angles based on the estimated Euler angles and the correction values.

In some embodiments, the corrections can be repeated until a difference between corresponding measured and calculated is below a predetermined threshold value or zero.

In some embodiments, the method can comprise:
(1) applying a normalization to the at least one measured on-axis intensity and the at least one measured off-axis intensity, thereby determining at least one normalized measured on-axis intensity and at least one normalized measured off-axis intensity,
(2) applying a normalization to the at least one calculated on-axis intensity and the at least one calculated off-axis intensity, thereby determining at least one normalized calculated on-axis intensity and at least one normalized calculated off-axis intensity, and
(3) calculating the correction values for the estimated Euler angles based on the at least one normalized measured on-axis intensity, the at least one normalized measured off-axis intensity, the at least one normalized calculated on-axis intensity and the at least one normalized calculated off-axis intensity.

Preferably, at least the above steps (2) and (3) can be carried out iteratively.

In some embodiments, a plurality of measured on-axis intensities and a plurality of off-axis intensities are provided, and wherein the measured on-axis intensities are grouped into at least one group, wherein the measured off-axis intensities are grouped into at least one group, wherein a group-specific normalization is applied to the intensities of an associated group.

The invention also relates to a method of determining Euler angles for a plurality of points on a sample, the method comprising:
- calculating a plurality of intensities for the points of a predetermined group of detection channels, wherein, preferably, the intensities are calculated by use of a Raman tensor,
- providing for the group of detection channels a plurality of measured intensities for the points, wherein, preferably, the measured intensities are obtained by using an apparatus in accordance with the present invention,
- calculating at least one correction coefficient for correcting the measured intensities based on the calculated plurality of intensities,
- applying the at least one correction coefficient to the measured intensities, thereby obtaining, for the points, corrected measured intensities of the group of detection channels, and
- calculating Euler angles for the points based on the corrected measured intensities of the group of detection channels.

The calculated intensities can represent calculated values for intensities, which can be obtained by use of an apparatus in accordance with the invention, when performing polarized Raman scattering experiments on the points of the sample. For each of the points on the sample, Raman spectra of polarized on-axis and off-axis Raman beams or of only polarized off-axis Raman beams can be obtained by an apparatus in accordance with the invention. Each obtained spectrum can be associated with a detection channel of the apparatus, and a selection of detection channels from the detection channels that can be provided by the apparatus can be regarded as a group of detection channels.

For each point, at least one intensity is measured and/or calculated per detection channel of the predetermined group of detection channels.

The predicted or calculated intensities and corresponding measured intensities can be used to calculate one or more correction coefficients, which can be used to obtain corrected intensities. The intensities can further be employed to determine Euler angles for the points on the sample.

In some embodiments, the method further comprises at least one of the following:
- determining an orientation map for the points based on the calculated Euler angles,
- applying a normalization to the calculated plurality of intensities, thereby obtaining normalized calculated plurality of intensities which are used instead of the calculated plurality of intensities for calculating the at least one correction coefficient,
- using the plurality of measured intensities for determining the normalization,
- calculating the at least one correction coefficient comprises determining for each point at least one correction coefficient and averaging over all points.

An orientation map can be a graphical representation showing, for example by use of a color coding, the Euler angles for all point.

A measured on-axis intensity can be an intensity value, in particular a peak value, taken from Raman spectral data obtained from an on-axis Raman beam. A measured off-axis intensity can be an intensity value, in particular a peak value, taken from Raman spectral data obtained from an off-axis Raman beam. Calculated intensities can be corresponding intensity values.

Steps of the above-described methods can be carried out iteratively.

The above described methods, or at least some of the steps, can be carried out by a computer, preferably a computer that is linked to an apparatus as described herein.

The invention also relates to a data processing system comprising means for carrying out at least some of the steps of the methods as described herein.

The invention also relates to a computer program product comprising instructions which, when the program is executed by a computer, cause the computer to carry out steps of the methods as described herein.

The invention also relates to a computer-readable storage medium comprising instructions which, when executed by a computer, cause the computer to carry out steps of the methods as described herein.

BRIEF DESCRIPTION OF THE DRAWINGS

One more exemplary embodiments of the present invention will hereinafter be described in conjunction with the following drawing figures, where like numerals denote like elements

DETAILED DESCRIPTION OF THE PREFERRED EMBODIMENTS

Polarization-resolved Raman spectroscopy can be used to carry out spectroscopy on a sample. In particular with regard to crystalline or polycrystalline samples, polarization-resolved Raman spectroscopy can be used for orientation mapping.

The grains of a polycrystalline sample usually have different crystallographic orientations. A full three-dimensional (3D) orientation mapping of the grains can provide information about the position, size, morphology, and orientation of each grain, as well as information about the topological connectivity between the grains. Such a mapping can be helpful to relate structure to properties.

Based on experimental and theoretical investigation of quantitative orientation mapping by use Raman spectroscopy, a method and apparatus has been developed which is in particular useful for carrying out polarization-resolved Raman spectroscopy on crystalline or polycrystalline samples. The method is also called SAROM.

Figure 1:
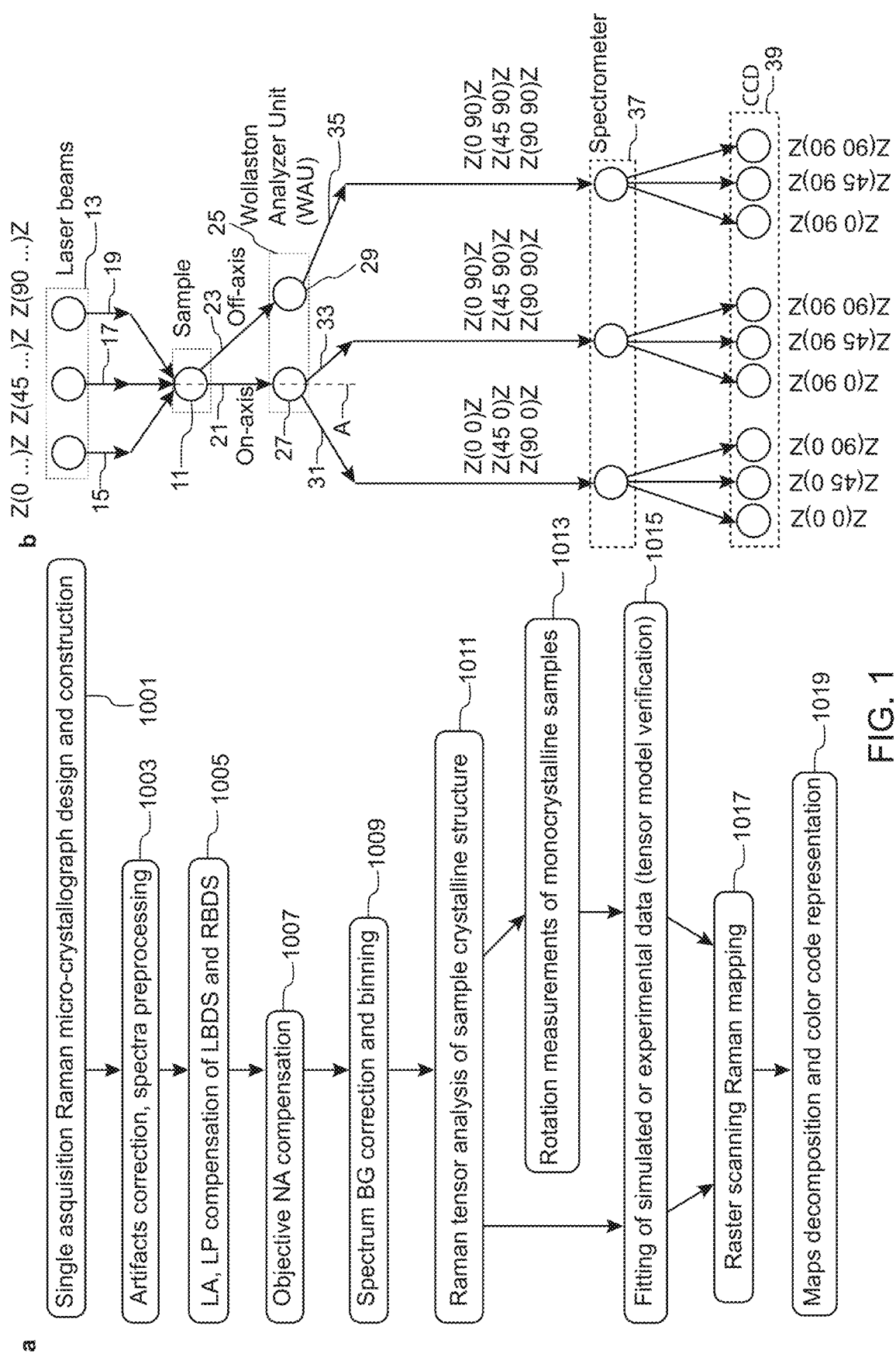
FIG. 1a shows a flow diagram that illustrates steps which can be used in conjunction with an apparatus for carrying out polarization resolved Raman spectroscopy.
FIG. 1b illustrates schematically the working principle of an exemplary embodiment of an apparatus for carrying out polarization resolved Raman spectroscopy in accordance with the present invention.

As shown in FIG. 1, such development included in step 1001 the design and construction of an exemplary embodiment of an apparatus for carrying out polarization-resolved Raman spectroscopy, which may be also known as Polarized (confocal) Raman Microscopy.

As will be explained later, the apparatus allows for the detection of Raman beams obtained from a sample. From each detected Raman beam, an optical spectrum can be obtained. Step 1003 relates to the aspect of preprocessing the obtained spectra and of carrying out an artefact correction. Artefact correction may comprise corrections with regard to at least one of the following: wavelength-dependent intensity attenuation, Raman intensity scaling and normalization, linear phase (LP) and linear amplitude (LA) anisotropy of each optical element, and depth-dependent birefringence.

As indicated in step 1005, linear phase and linear amplitude compensation may be carried out with regard to a laser beam delivery system (LBDS) and with regard to a Raman beam delivery system (RBDS). The laser beam delivery system can be the optical system, which is used to provide one or more laser beams, each of which has preferably a defined polarization, to the sample. The Raman beam delivery system can be regarded as the optical setup that is configured to process the Raman light scattered by the sample.

As indicated in steps 1007 and 1009 a correction or compensation may be applied with regard to the numerical aperture (NA) of the objective which is used to focus the laser beams from the LBDS on the sample and/or to collect the Raman light scattered from the sample.

As indicated in step 1009, the artefact correction may further include the correction of a spectrum BG-mode and binning.

According to step 1011, the flow diagram includes a Raman tensor analysis of the sample crystalline structure. If the symmetry of a crystal is known, Raman tensors for crystal modes can be obtained and Raman intensities versus sample location angle can be simulated. A correction between theoretical and experimental angular intensity dependencies can be used for determination of local crystallographic orientation.

Optionally, Raman intensities versus sample rotation angle can be experimentally determined as indicated in step 1013 according to which one or more rotation measurements of monocrystalline samples are carried out. This might be used to verify the functionality of an apparatus or method in accordance with the present invention, where a rotation of the sample is not required.

Optionally, in step 1015, a fitting of simulated or experimental data takes place in order to verify a Raman tensor model. This step might be used if the symmetry of the sample is not known.

In step 1017, using an apparatus for carrying out polarization-resolved Raman spectroscopy, a polycrystalline sample is scanned while Raman signals are collected.

Based on the collected Raman signals, a 2D or 3D map of the surface of the scanned sample can be generated in a color-code representation in accordance with step 1019.

Embodiments of an apparatus in accordance with the present invention for carrying out polarization-resolved Raman spectroscopy will be described in more detail in the following.

FIG. 1b shows schematically the working principle of an exemplary embodiment of an apparatus in accordance with the present invention for carrying out polarization-resolved Raman spectroscopy on a sample 11. The sample 11 is in particular a crystalline or polycrystalline sample.

The apparatus comprises at least one light source 13 which is configured to provide three laser beams 15, 17, and 19 with different orientation of polarization state. For example, the laser beam 15 has a polarization of 0°, the laser beam 17 has a polarization of 45°, and the laser beam 19 has a polarization of 90°. The three laser beams 15, 17 and 19 are focused on the sample 11, preferably on spatially separated spots. This configuration is particularly useful in a 2D mapping configuration.

The apparatus furthermore comprises an optical system with an optical axis (A). The optical axis A may be defined by the objective (not shown in FIG. 1b) of the optical system that is used to collect the Raman light scattered from the sample 11. The optical components of the optical system might be centered with regard to and arranged along the optical axis A (see for example in FIG. 2).

The optical system is in particular configured to collect at least one on-axis Raman beam 21 and at least one off-axis Raman beam 23 from the Raman light scattered by the sample in response to exposing the sample 11 to the excitation radiation provided by the three laser beams 15 to 19. The optical system of the apparatus furthermore comprises a Wollaston analyzer unit (WAU) 25 which comprises a central polarizing beam splitter 27 and an analyzer 29. The optical axis of the central polarizing beam splitter 27 coincides with the optical axis A of the optical system. Each of the three on-axis Raman beams is split into two perpendicularly polarized beams 31, 33, for example, with 0° and 90° polarization.

The analyzer 29 is positioned in a radial direction at a distance with regard to the optical axis A. The optical axis of the analyzer 29 can be aligned in such a way that it is parallel to the optical axis A of the optical system.

The analyzer 29 is furthermore positioned in such a way that the three off-axis Raman beams 23 pass through the analyzer 29 which is configured to filter for example the 90° polarization component from each of the three off-axis Raman beams 23, resulting in three polarized off-axis Raman beams 35. The in total six polarized on-axis Raman beams 31, 33 and the three polarized off-axis Raman beams 35 are further sent through a spectrometer which comprises a transmission grating that splits each of the polarized Raman beams 31 to 35 into its spectral components. This results in nine different optical spectra of spatially separated wavelength components that are focused by use of a focusing lens system (not shown in FIG. 1b) on different regions on a two-dimensional CCD array detector 39 (CCD for charged-coupled device). The detector 39 can also be a CMOS detector or any other suitable type of detector. CMOS is an acronym for complementary metal-oxide-semiconductor. The apparatus of FIG. 1b allows for a simultaneous registration of nine Raman spectra obtained from collected on-axis and off-axis Raman beams, each of which having a particular polarization.

The apparatus can be employed in a raster-scanning mode. In particular, the apparatus may be used to take a measurement on a surface point of the sample 11. After that, the sample 11 and/or the spots of the laser beams 15 to 19 on the surface of the sample 11 are moved to take a measurement on other surface points. In this way, the surface of the sample 11 can be scanned and measurements can be obtained from a plurality of surface points. The measured data can be used to carry out a mapping of the surface of the sample.

The setup of FIG. 1b is in particular useful for carrying out a 2D orientation mapping and can therefore be used to obtain information about the position, size, morphology, and orientation of one or more surface planes of the sample 11.

The apparatus in accordance with FIG. 1b is particularly advantageous as it allows to simultaneously collect, from Raman light scattered by the sample 11, on-axis Raman beams 31, 33 and off-axis Raman beams 23 and to process the on-axis Raman beams 21 and the off-axis Raman beams 23 independently from each other in the optical system.

In particular, in order to process the on-axis and off-axis Raman beams independently from each other, the optical system comprises at least one optical device, here the Wollaston analyzer unit WAU 25, which is configured to generate from each of the on-axis Raman beam 21 and the off-axis Raman beam 23 at least one polarized on-axis Raman beam 31, 33 and at least one polarized off-axis Raman beam 35. From at least a selection of these polarized Raman beams, an optical spectrum can be obtained by use of the detector 39.

Figure 2:
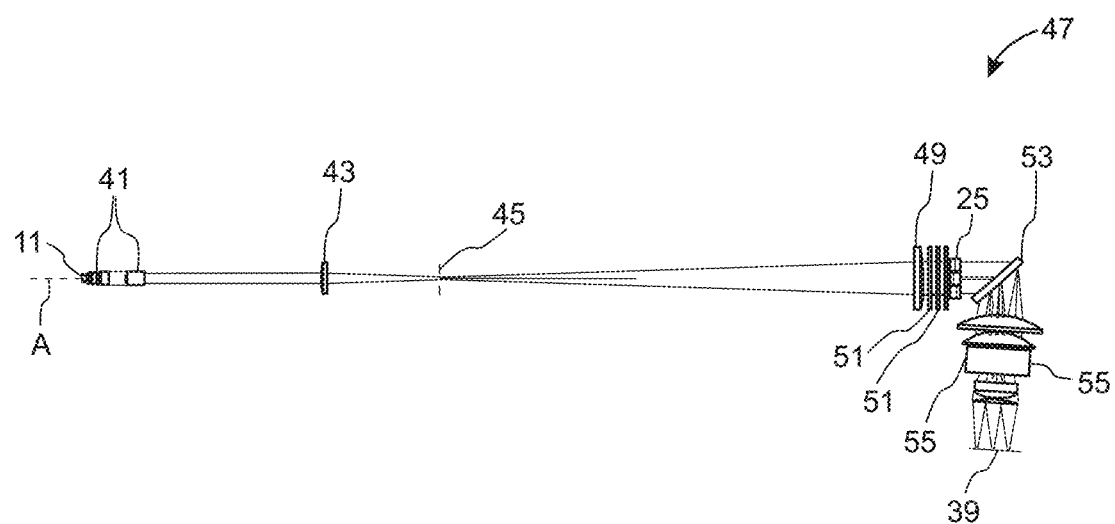
FIG. 2 shows schematically an optical setup of an exemplary embodiment of an apparatus in accordance with the present invention.

FIG. 2 shows schematically an optical setup of an exemplary embodiment of an apparatus in accordance with the present invention. FIG. 2 does not show a laser beam delivery optical system, herein also called laser beam delivery system (LBDS), which is configured to provide polarized laser beams (see, for example, laser beams 15 to 19 in FIG. 1b) to a sample 11. When the sample 11 is illuminated by the polarized Raman beams, Raman light can be scattered by the sample.

The optical system comprises an objective 41 which is aligned with the optical axis A of the optical system and used to collect simultaneously, from the Raman light scattered by the sample in response to exposing the sample 11 to the laser beams, the portion of the Raman light that can be accepted by the objective 41. The objective 41 can be a custom-made objective, and the objective 41 can have a large diameter and/or a high numerical aperture. The objective 41 can be an immersion-type objective which allows performing off-axis measurements at 45° with regard to the optical axis A. Due to the objective 41 and an optional mask with a pinhole, which is aligned with the optical axis A, and another pinhole that it is radially outside of the optical axis A, at least one on-axis Raman beam and at least one off-axis Raman beam can be obtained. In some embodiments, only one or more off-axis Raman beams are collected. Then, the pinhole which is aligned with the optical axis A is not required.

A focusing lens 41 focuses the at least one on-axis Raman beam and the at least one off-axis Raman beam through a slit 45 into a spectrometer 47 which comprises a collimating lens 49 for collimating the at least one on-axis Raman beam and the at least one off-axis Raman beam.

The spectrometer 47 also comprises one, two, or even more filters 51 followed by a Wollaston analyzer unit 25. This unit 25 can comprise a central polarizing beam splitter (not shown) having an optical axis that is aligned with the optical axis A of the optical system. The polarizing beam splitter can generate from on-axis Raman beam two orthogonally polarized on-axis Raman beams. Each of these polarized Raman beams has a particular polarization, and the beams are locally separated from each other and travel in different directions.

The unit 25 further comprises a peripheral analyzer (not shown) acting as a polarizing filter that filters a polarization out of an off-axis Raman beams that passes through the analyzer. After the analyzer, the off-axis Raman beam is polarized with a polarization set by the analyzer.

The polarized on-axis and off-axis Raman beams pass through a transmission diffraction grating 53 which splits each beam into its spectral components. The spectral components are focused by use of a focusing lens system 55 on a detector 39 which can detect the spectra from the polarized on-axis and off-axis Raman beams simultaneously in different regions of the detector 39.

Figure 3:
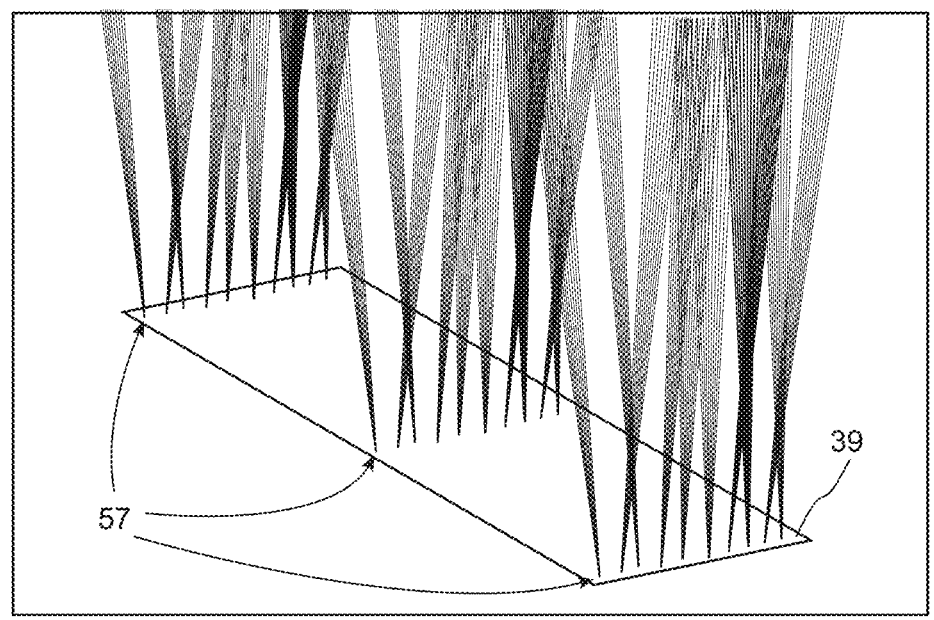
FIG. 3 shows schematically a perspective view on a detector of the apparatus of FIG. 2.

FIG. 3 shows a perspective view on the detector 39, which can be a CCD array detector. FIG. 3 indicates that different spectra 57, obtained from the different polarized on-axis or off-axis beams, are detected on different regions of the detector 39. Theoretical investigation of orientation ambiguity and error showed that basic orientation determination becomes possible for four or more channels, wherein each channel is associated with one detected spectrum. For some specific orientations, intensity data remains ambiguous and a rotation angle of a sample surface cannot be recovered. This is for example the case for the (111) crystal plane of a silica wafer, where the misorientation angle can vary from zero to the largest possible for a cubic symmetry corresponding to 62.8 degrees. Nevertheless, even for such ambiguous data, some orientation data could be recovered, and it can be possible to clearly distinguish silica wafer crystal planes (100), (111) even with four measurement channels. The determination of a full wafer orientation usually requires the determination of nine or more channels.

In a 2D mapping configuration, the sample 11 is preferably illuminated with a single laser source. Three laser beams with a different orientation of polarization state are spatially separated on the sample 11 and on the spectroscopic CCD focal planes. The three laser beams with three different orientation of polarization result in six polarized on-axis Raman beams and in three polarized off-axis Raman beams.

In a 3D mapping configuration, the sample 11 is preferably illuminated by use of three different laser sources. The resulting three laser beams have different wavelengths and different orientation of polarization. Their spots may completely or partially overlap on the surface of the sample 11. They become separated on the plane of the detector 39 due to slightly different excitation wavelengths.

Figure 4:
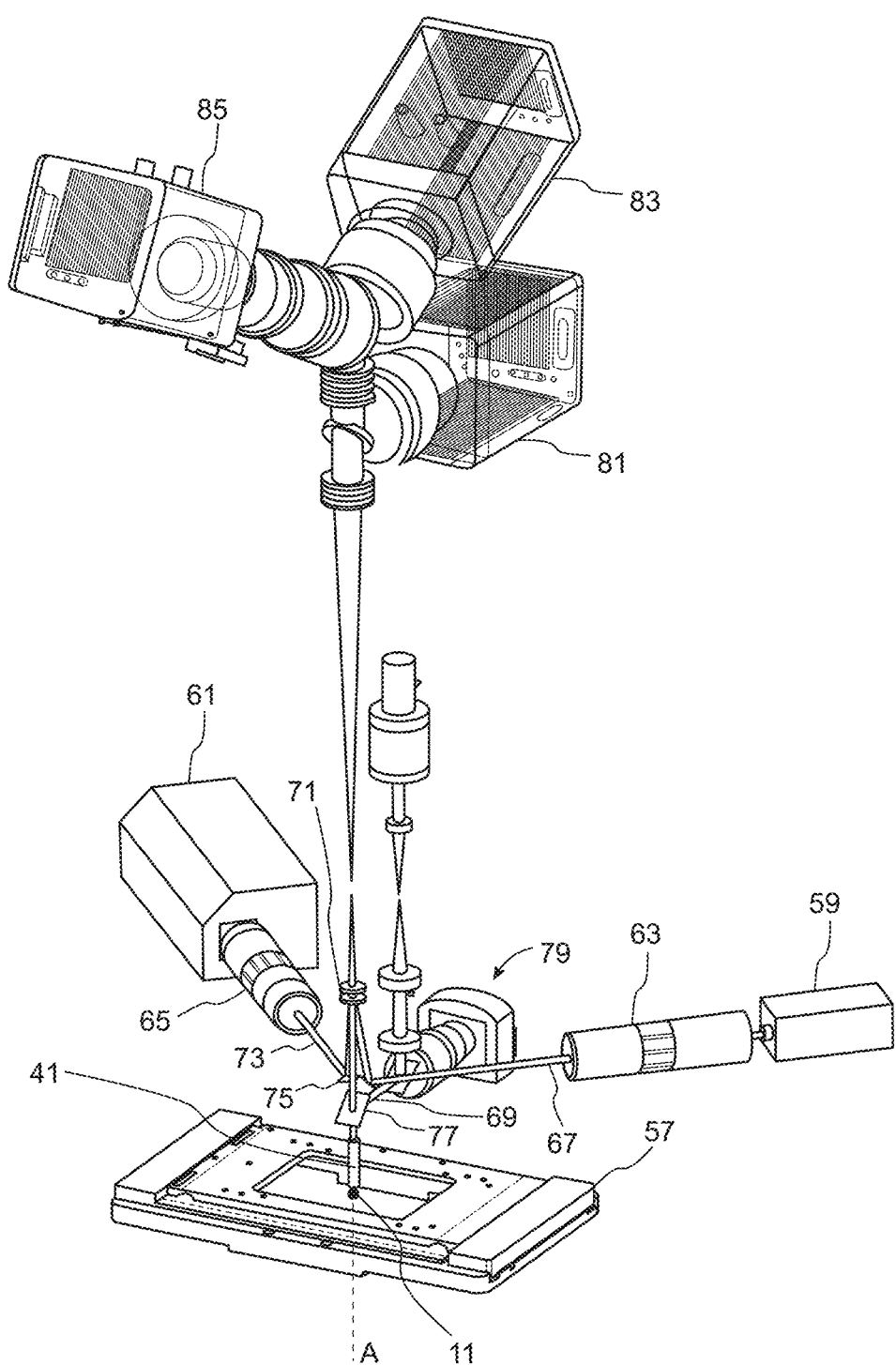
FIG. 4 shows schematically a perspective view of an exemplary embodiment of an apparatus in accordance with the present invention.

FIG. 4 shows schematically a perspective view of a further exemplary embodiment of an apparatus in accordance with the present invention. In this embodiment, the sample 11 is placed on a scanning stage 57. The scanning stage 57 can be moved in a plane which is perpendicular to the optical axis of an optical system of the apparatus.

The apparatus comprises two lasers 59, 61. The lasers 59, 61 can for example be used optionally. The first laser 59 can provide laser light at a wavelength of 532 nm. The second laser can provide laser light at a wavelength of 785 nm. A polarizer 63 is used to polarize the laser beam provided by the first laser 59, so that a polarized laser beam 67 can be provided by the first laser 59 to the sample 11. The polarized laser beam 67 is reflected from a mirror 69 and from a dichroic mirror 71 which reflects the laser beam 67 such that it travels along the optical axis A. Furthermore, the beam 67 is focused by the objective 41 which is also employed for a collection of the Raman scattered light from the sample 11.

Similarly, a polarizer 65 is used to polarize the laser light provided by the second laser 61 such that a polarized laser beam 73 can be provided to the sample 11. The laser beam 73 is reflected from mirror 75 and the dichroic mirror 71 such that the laser beam 73 also travels along the optical axis A and through the objective 41 to the sample.

The laser beams 67, 73 can pass through a dichroic mirror 77. The dichroic mirror 77 is used to reflect a laser beam provided by a microscope 79, such that the laser beam from the microscope also travels along the optical axis A towards the sample 11.

The setup of the optical system for processing the Raman light scattered from the sample 11 can be similar to the optical system as described with regard to FIGS. 1b and 2.

As a particular example, the apparatus as shown in FIG. 4 comprises a first spectrometer 81 for detecting spectra of polarized on-axis and off-axis Raman beams obtained from using the second laser 61 providing a laser beam at 785 nm.

A second spectrometer 83 is a low-resolution spectrometer for resolving Raman spectra of polarized on-axis and off-axis beams obtained from using the first laser 59 providing laser light at 532 nm. The third spectrograph 85 is a high-resolution spectrograph that can also be used in conjunction with the first laser 59.

Figure 5:
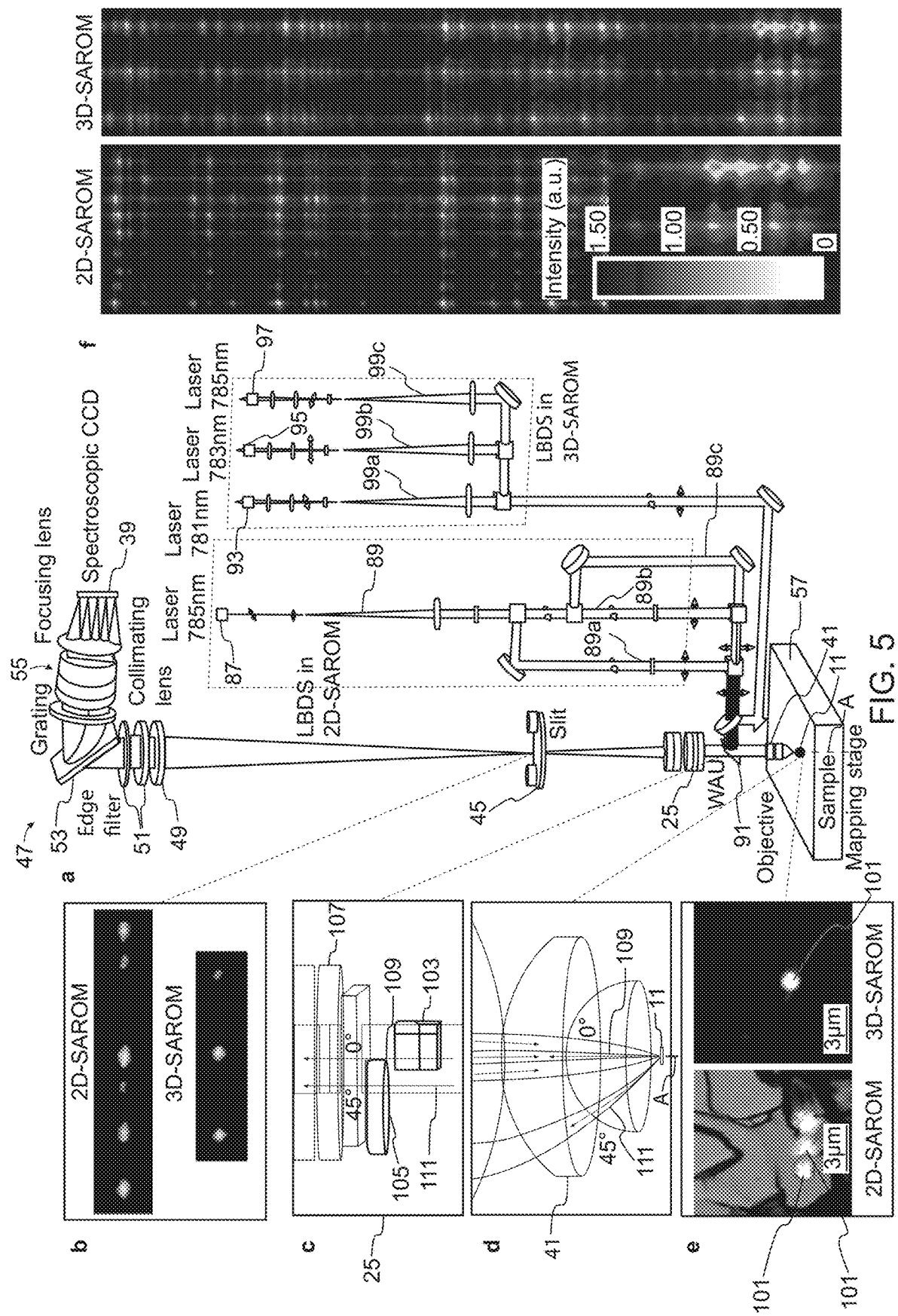
FIGS. 5a-f show schematically the design and working principle of an exemplary embodiment of an apparatus in accordance with the present invention.

FIG. 5a shows an optical setup of an apparatus in accordance with the present invention. The functionality of the apparatus is similar to the functionality as described with regard to FIGS. 1b, 2, and 3 concerning the detection of Raman light from the sample 11. However, in contrast to the embodiment of FIG. 2, the Wollaston analyzer unit 25 is located in the apparatus as shown in FIG. 5 between the objective 41 and the entrance slit 45 of the spectrometer 47.

As mentioned before, for carrying out a 2D quantitative orientation mapping with respect to a sample, preferably only one laser 87 is employed. As an example, the laser 87 can provide laser light at a wavelength of 785 nm. The laser beam 89 provided by laser 87 is split into three parts, and thus into laser beams 89a, 89b, and 89c. Each of the laser beams 89a, 89b and 89c is polarized with a different polarization, for example 0°, 45° and 90°. Thus, one of the beams has a polarization of 0°, one of the beams has a polarization of 45°, and one of the beams has a polarization of 90°. The laser beams 89a, 89b and 89c are superimposed again and reflected from dichroic mirror 91 such that the laser beams 89a, 89b and 89c travel along the optical axis A towards the sample 11. They are focused by the objective 41 preferably on spatially separated spots on the sample. The left picture of FIG. 5e shows a microscope image of the three laser spots on the sample 11.

For carrying out a 3D orientation mapping, preferably three lasers 93, 95 and 97 are used. For example, the laser 93 can provide a laser beam at a wavelength of 781 nm, and it can be linearly polarized at a polarization angle of 0°. The laser 95 can provide a laser light beam at a wavelength of 783 nm, and it can be linearly polarized at a polarization angle of 45°. The laser 97 can provide a laser beam at a wavelength of 785 nm, and it can be linearly polarized at a polarization angle of 90°. The laser beams 99a, 99b and 99c can be superimposed and delivered to the sample 11. Preferably, the three laser beams with different orientation of polarization state overlap on the sample 11. Correspondingly, FIG. 5e shows on the right only one laser spot 101 in a microscope image.

The Raman light beams that are detected on the detector 39 become separated due to the slightly different excitation wavelengths. FIG. 5f shows images of resulting Raman spectra from a carbamazepine drug obtained on the detector in the 2D-configuration (left-hand image) and in the 3D-configuration (right-hand image).

Furthermore, FIG. 5b shows in the upper part an image of polarized Raman beams passing through the slit 45 of the spectrometer 47 for the 2D-configuration. The bottom image of FIG. 5b shows polarized Raman beams passing through the spectroscopic slit focal plane for the 3D-configuration.

FIG. 5c shows an on-axis Raman beam 109 passing through a Wollaston prism 103 which is arranged in the unit 25. Thereby, two perpendicularly polarized on-axis Raman beams are generated. Each of the two polarized on-axis beams causes a Raman spectrum in a different region of the detector 39.

Furthermore, FIG. 5c shows one off-axis Raman beam 111 that passes through an analyzer 105 arranged in the unit 25. Thereby, a linearly polarized off-axis Raman beam is generated. The spectrum of this beam is also detected by use of detector 39.

As shown in FIG. 5c, the unit 25 can include a mask 107. The mask 107 can for example have the form of a plate with pinholes (not shown) through which the on-axis and off-axis Raman beams can pass. The pinholes can help in shaping the on-axis and off-axis Raman beams.

FIG. 5d illustrates schematically the illumination of the sample 11 by the incoming laser beams and the Raman signal collection geometry in on-axis (0°) and off-axis (45°) scattering pathways. As shown in FIG. 5d, an off-axis Raman beam can be due to Raman scattered light that is inclined at an angle of up to 45° with respect to the optical axis A of the objective 41.

Each polarized on-axis or off-axis Raman beam of which a spectrum is detected on the detector 39 can be regarded as a detection channel provided by the exemplary apparatus as described above.

Figure 6:
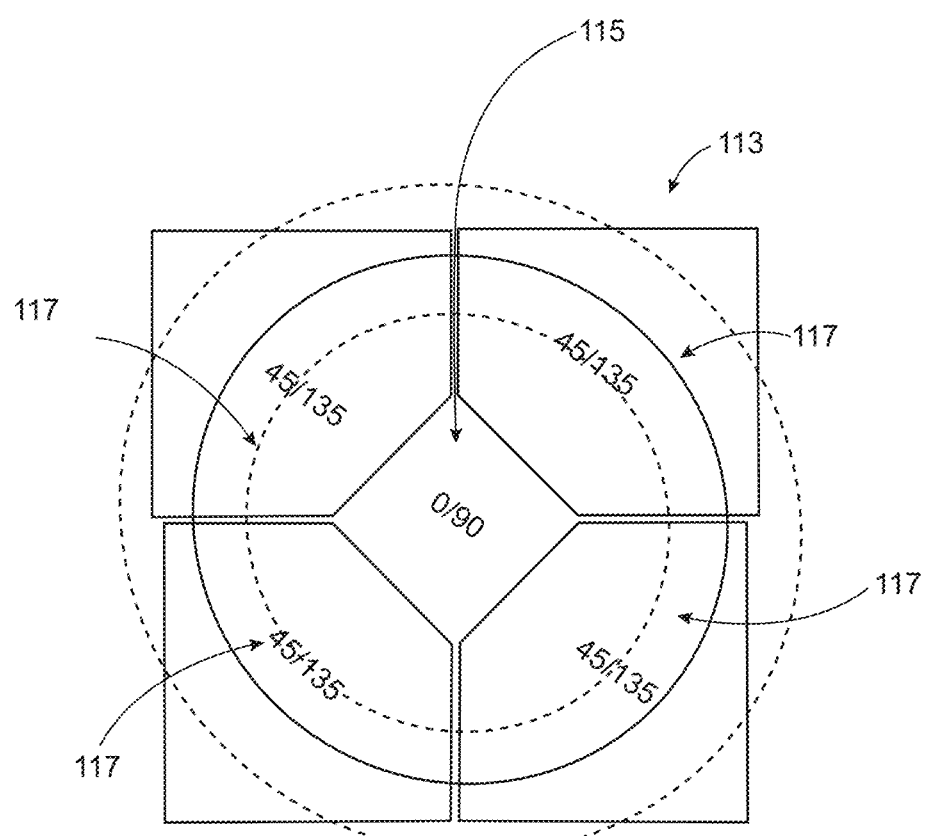
FIG. 6 shows a cross-sectional view of an optical device having a central polarization sensitive element and four peripheral polarization sensitive elements.

FIG. 6 shows a cross-sectional view of an optical device 113 having a central polarization sensitive element, here a center Wollaston prism 115, and four peripheral polarization sensitive elements, here four peripheral Wollaston prisms 117, which are arranged circumferentially around the center Wollaston prism 115.

The center Wollaston prism 115 is configured to generate two polarized on-axis Raman beams (with 0° and 90° polarization) per incident on-axis Raman beam. Each peripheral Wollaston prism 117 is also configured to generate two polarized off-axis Raman beams (with 45° and 135° polarization) per incident off-axis Raman beam.

In an optical setup as described for example with regard to FIG. 5, the optical device 113 can be used as replacement for WAU 25, with the optical axis of the center Wollaston prism 115 being aligned with the optical axis A.

From each of the three beams 89a, 89b, 89c or 99a, 99b or 99c that are incident on the sample 11 (see FIG. 5), one on-axis Raman beam can be collected, resulting in 6 polarized on-axis Raman beams emerging from the center Wollaston prism 115. Furthermore, from each of the three beams that are incident on the sample 11, an off-axis Raman beam can pass through each peripheral Wollaston prism 117. Thus, from each peripheral Wollaston prism 117, six polarized off-axis Raman beam can emerge. This results in 30 polarized on-axis and off-axis Raman beams, and thus in 30 detection channels.

Preferably, the three laser beams are not employed such that they are simultaneously incident on the sample 11. Rather, they are used sequentially to illuminate the sample 11. Thus, 10 channels can be detected simultaneously by using the optical device 113 in a set-up as shown in FIG. 5.

The optical device 113 can be arranged in the setup at a position which differs from the position of WAU 25. For example, the optical device can be positioned between collimating lens 46 and grating 53.

The peripheral Wollaston prisms 117 having an optical axis that is shifted from the optical axis A of the optical system and the objective 41 (see FIG. 5) can also be used to separate the off-axis Raman beams out of the Raman signal that is provided by the objective 41 to the device 113. Similarly, the Wollaston prism 115 can be used to separate the on-axis Raman beams out of the Raman signal. A mask 107 (see FIG. 5c) can optionally be used to spatially separate the on-axis and off-axis Raman beams from each other.

Figure 7:
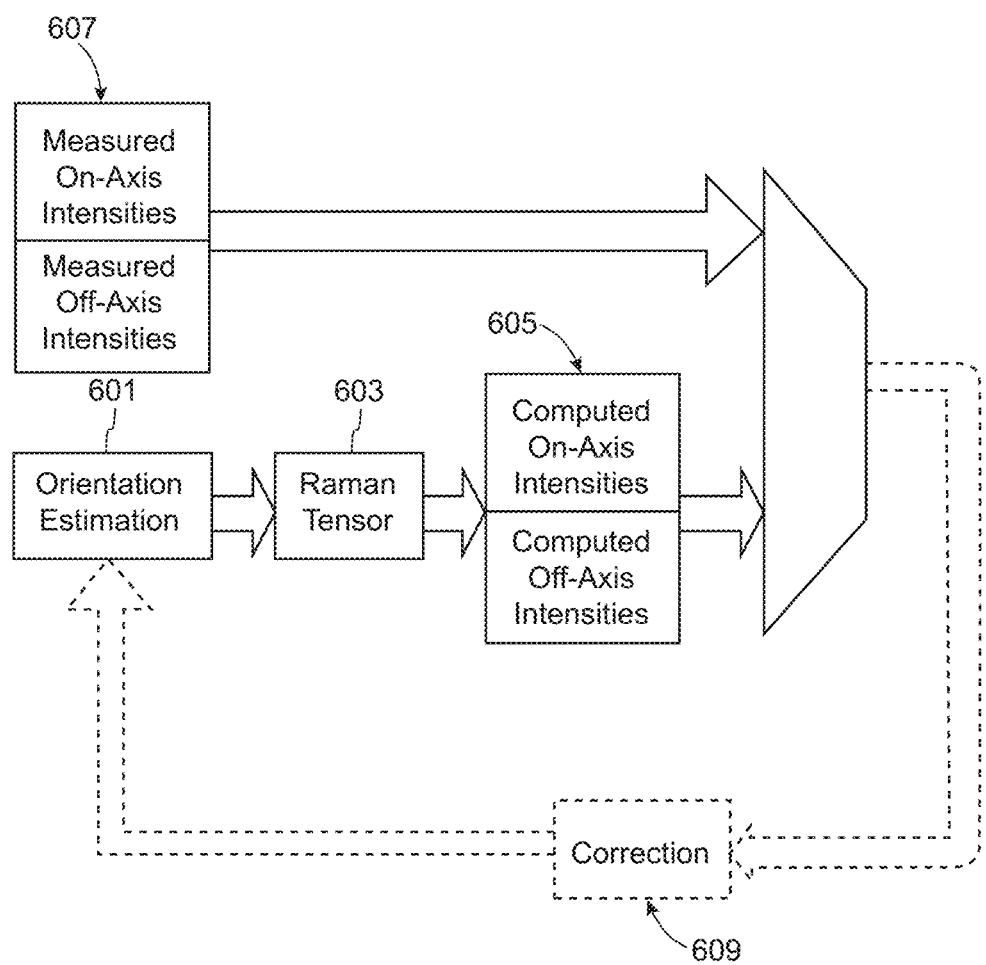
FIG. 7 shows a diagram which illustrates schematically a fitting approach to find orientation angles.
Figure 8:
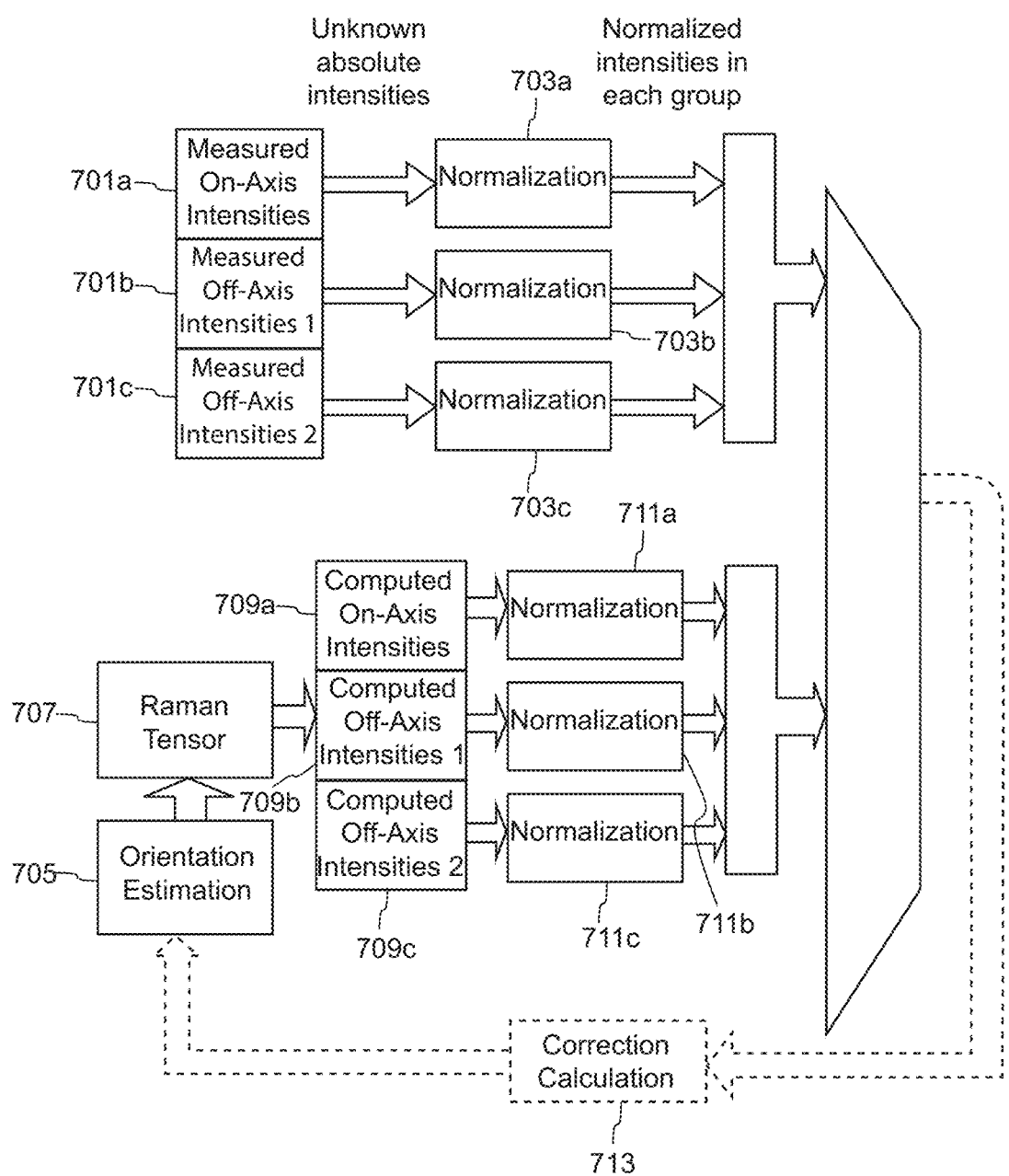
FIG. 8 shows a diagram which illustrates schematically another fitting approach to find orientation angles which can compensate unknown absolute intensities of the detected RAMAN beams.
Figure 9:
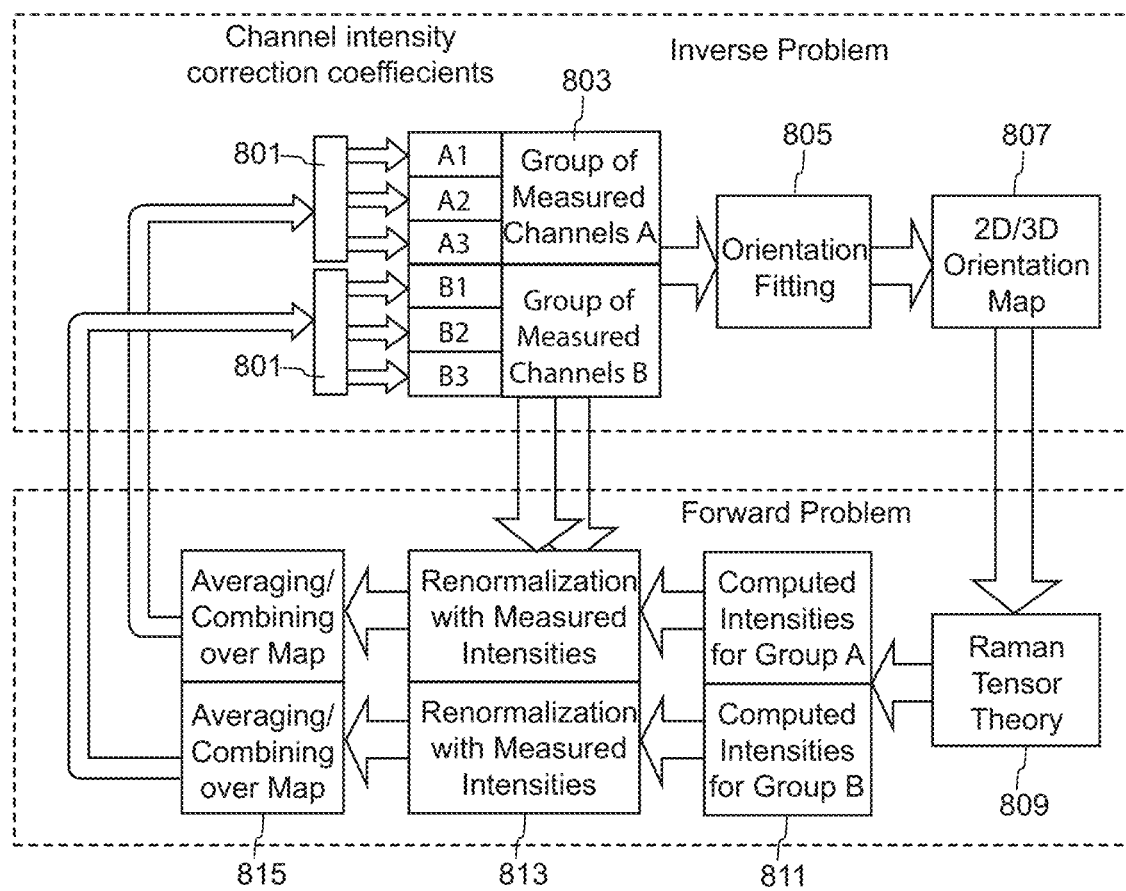
FIG. 9 shows a diagram which illustrates schematically a procedure to calibrate channel intensities.

FIGS. 7 to 9 relate to exemplary methods that can be applied to carry out 2D and 3D orientation mapping for a sample based on the measured Raman intensities obtained from the detection channels.

FIG. 7 shows a diagram which illustrates schematically a first exemplary embodiment of a method in accordance with the present invention. The method relates to a fitting approach to find orientation angles which correspond to Euler angles that are related to the orientation of a surface plane of a sample.

In step 601, estimated Euler angles are provided.

In step 603, the estimated Euler angles can be used along with a Raman tensor, which is known from theory, for the crystal structure of the sample.

In step 605, expected on-axis and off-axis Raman beam intensities are computed.

In step 607, measured on-axis and off-axis Raman beam intensities are provided.

In step 609, the computed on-axis and off-axis intensities and the corresponding measured on-axis and off-axis Raman beam intensities can be used to determine correction values. The correction values can be used to correct the estimated Euler angles.

The process can restart again with step 601 using the corrected Euler angles as new estimated Euler angles.

The process can continue until the correction values or differences between the computed on-axis and off-axis intensities and the measured on-axis and off-axis intensities are zero or below a predetermined threshold value. Then, the obtained Euler angles are assumed to describe the orientation of the sample surface at the location on the sample from which the measured intensities have been obtained.

Still referring to FIG. 7, in some embodiments a method of determining Euler angles for a point on a sample comprises:

providing estimated Euler angles in step 601,
providing, in step 607, at least one measured on-axis intensity and at least one measured off-axis intensity obtained from polarized Raman spectroscopy carried out on the point of the sample, in particularly by use of an apparatus as described herein,
(a) calculating, in steps 603 and 605, at least one on-axis intensity and at least one off-axis intensity, preferably by using a Raman tensor associated with a crystal structure of the sample, (b) calculating, in step 609, correction values for the estimated Euler angles based on the at least one measured on-axis intensity, the at least one measured off-axis intensity, the at least one calculated on-axis intensity and the at least one calculated off-axis intensity, and
(c) determining corrected Euler angles based on the estimated Euler angles and the correction values.

Steps (a) to (c) can be repeated iteratively until the correction values or differences between the corrected Euler angles and the previous Euler angles are below a threshold value or zero.

FIG. 8 shows a diagram which illustrates schematically a second exemplary embodiment of a method in accordance with the present invention. The method relates to another fitting approach to find orientation angles which correspond to Euler angles that are related to the orientation of a surface plane of a sample.

In step 701, intensities measured for on-axis beams and off-axis beams are grouped into several groups, with each group having similar intensities in the detected Raman spectra. For example, as indicated in FIG. 8, the intensities measured for the on-axis Raman beam are grouped into one group, for example group 1, according to step 701a. Intensities measured for some of the off-axis Raman beams are grouped into another group, for example group 2, according to step 701b. Intensities measured for the remaining off-axis Raman beams are grouped into a further group, for example group 3, according to step 701c.

In step 703a, the intensities of group 1 are normalized so that normalized intensities are obtained for group 1. In step 703b, the intensities of group 2 are normalized so that normalized intensities are obtained for group 2. In step 703c, the intensities of group 3 are normalized so that normalized intensities are obtained for group 3.

In step 705, Euler angles which are related to the orientation of a surface plane of a sample are estimated.

In step 707, the estimated Euler angles are used along with a Raman tensor associated with the crystal structure of the sample to compute expected on-axis and off-axis Raman beam intensities for groups 1, 2 and 3 in steps 709a, 709b, 709c.

In step 711a, the computed on-axis intensities for group 1 are normalized. In step 711b, the computed off-axis intensities for group 2 are normalized. In step 711c, the computed off-axis intensities for group 3 are normalized.

In step 713, for each group 1 to 3, the computed and measured normalized intensities are used to calculate correction values.

The correction values obtained in step 713 are used to determine corrected Euler angles, which are used in a new step 705. The procedure as described above can be repeated again, for example as long as the correction values determined in step 713 are below a predetermined threshold value.

In some embodiments, and using the method of FIG. 7 as a starting point, the method FIG. 8 comprises applying according to steps 703a, 703b, 703c, a normalization to the at least one measured on-axis intensity and the at least one measured off-axis intensity, thereby determining at least one normalized measured on-axis intensity and at least one normalized measured off-axis intensity, applying according to steps 709a, 709b, 709c a normalization to the at least one calculated on-axis intensity and the at least one calculated off-axis intensity, thereby determining at least one normalized calculated on-axis intensity and at least one normalized calculated off-axis intensity, and calculating according to step 713 the correction values for the estimated Euler angles based on the at least one normalized measured on-axis intensity, the at least one normalized measured off-axis intensity, the at least one normalized calculated on-axis intensity and the at least one normalized calculated off-axis intensity.

Furthermore, in some embodiments, according to steps 701a, 701b, 701c, a plurality of measured on-axis intensities and a plurality of measured off-axis intensities are provided, and the measured on-axis intensities are grouped into at least one group, and the measured off-axis intensities are grouped into at least one group, and according to steps 703a, 703b, 703c a group-specific normalization is applied to the intensities of an associated group.

FIG. 9 shows a diagram which illustrates schematically a procedure to calibrate channel intensities.

In step 801, channel intensity correction coefficients A1, A2, A3, B1, B2, B3 are determined for each group of measured channels A, B. Each channel A, B corresponds to a polarized on-axis or off-axis Raman beam.

In step 803, the channel intensity correction coefficients A1, A2, A3, B1, B2, B3 are applied to the measured intensities of the Raman spectra of the associated groups.

In step 805, an orientation fitting is carried out from which a 2D or 3D orientation map of the sample is obtained in step 807.

In step 809, from Raman tensor theory, in particular by taking account the crystalline structure of the sample, intensities of the Raman spectra can be calculated as they are expected to occur in each of the groups.

In step 811, the intensities of the Raman spectra computed for each group are used to obtain normalization factors in step 813 by taking account of the intensities of the Raman spectra measured for each group according to step 803.

In step 815, the normalization factors can be combined or averaged taking account of the measured and calculated data obtained for the complete scanning region and thus for the complete mapping region.

The averaged normalization factors obtained in step 815 can be used as input for determining the channel intensity correction coefficients for each group. The corrected measured intensities of the Raman spectra could be used to obtain more precise group-specific normalization factors in step 801.

In some embodiments, a method of determining Euler angles for a plurality of points on a sample comprises:

calculating (steps 809 and 811) a plurality of intensities for the points of a predetermined group of detection channels, wherein, preferably, the intensities are calculated by use of a Raman tensor, providing (step 803) for the group of detection channels a plurality of measured intensities for the points, calculating (step 801) at least one correction coefficient for correcting the measured intensities based on the calculated plurality of intensities, applying the at least one correction coefficient to the measured intensities, thereby obtaining, for the points, corrected measured intensities of the group of detection channels (steps 801 and 803), calculating (step 805) Euler angles for the points based on the corrected measured intensities of the group of detection channels.

Further, the method can comprise at least one of the following: determining (step 807) an orientation map for the points based on the calculated Euler angles, applying (step 813) a normalization to the calculated plurality of intensities, thereby obtaining normalized calculated plurality of intensities which are used instead of the calculated plurality of intensities for calculating the at least one correction coefficient, using (steps 803 and 813) the plurality of measured intensities for determining the normalization, calculating (step 815) the at least one correction coefficient comprises determining for each point at least one correction coefficient and averaging over all points.

In the examples described with regard to FIGS. 1 to 9, it is assumed that on-axis and off-axis Raman beams are collected. However, in some embodiments, only one or more off-axis Raman beams are collected, resulting in only polarized off-axis Raman beams. The intensities of the spectra obtained from the off-axis Raman beams might also be employed in a surface mapping process.

Preferred embodiments of the present invention are also described in the following list of items. A feature, which is mentioned for one embodiment, can also be present in another embodiment, even if this is not explicitly mentioned.

Item 1: An apparatus for carrying out polarization resolved Raman spectroscopy on a sample, in particular a crystalline or polycrystalline sample, the apparatus comprising:

at least one light source, in particular at least one laser, for providing excitation radiation to a surface of the sample, an optical system which is configured to simultaneously collect at least one on-axis Raman beam and at least one off-axis Raman beam from Raman light scattered by the sample in response to exposing the surface to the excitation radiation, the at least one on-axis Raman beam being scattered from the sample in a direction that is aligned with an optical axis of the optical system, the at least one off-axis Raman beam being scattered from the sample in a direction that is inclined with regard to the optical axis of the optical system, the optical system being configured to generate at least one polarized on-axis Raman beam from the at least one on-axis Raman beam and at least one polarized off-axis Raman beam from the at least one off-axis Raman beam, and the optical system being further configured to generate an optical spectrum from each of the at least one polarized on-axis Raman beam and the at least one polarized off-axis Raman beam.

Item 2: The apparatus of item 1,
characterized in that
the at least one off-axis Raman beam travels along a propagation direction in the optical system which is offset from the optical axis.

Item 3: The apparatus in accordance with item 1 or 2,
characterized in that
the optical system comprises an objective for collecting both, the at least one on-axis Raman beam and the at least one off-axis Raman beam, the objective being aligned with regard to the optical axis.

Item 4: The apparatus in accordance with item 1 or 2,
characterized in that the optical system comprises a first objective for collecting the at least one on-axis Raman beam and at least a second objective for collecting the at least one off-axis Raman beam.

Item 5: The apparatus in accordance with any one of the preceding items,
characterized in that
the optical system comprises a central polarization sensitive element comprising a central polarizing beam splitter, in particular a Wollaston prism, and/or an analyzer, and
the optical axis of the central polarization sensitive element optical axis coincides with the optical axis of the optical system.

Item 6: The apparatus in accordance with any one of the preceding items,
characterized in that
the optical system comprises at least one peripheral polarization sensitive element comprising a peripheral polarizing beam splitter, in particular a Wollaston prism, and/or an analyzer, and
the optical axis of the peripheral polarization sensitive element is arranged in a radial direction at a distance and in parallel to the optical axis of the optical system.

Item 7: The apparatus in accordance with item 5 or 6,
characterized in that
the central polarizing beam splitter is arranged such that the at least one on-axis Raman beam passes through the central polarizing beam splitter which splits the off-axis Raman beam into two polarized off-axis Raman beams, each of which has a defined polarization, and/or
the peripheral polarizing beam splitter is arranged such that the at least one off-axis Raman beam passes through the peripheral polarizing beam splitter which splits the off-axis Raman beam into two polarized off-axis Raman beams, each of which has a defined polarization.

Item 8: The apparatus in accordance with any one of the items 5 to 7,
characterized in that
the analyzer of the central or peripheral polarization sensitive element is configured to generate a polarized on-axis or off-axis Raman beam from a respective on-axis or off-axis beam.

Item 9: The apparatus in accordance with any one of the preceding items,
characterized in that
the optical system comprises at least one mask which provides a pinhole for each of the on-axis and off-axis Raman beams.

Item 10: The apparatus in accordance with any one of the preceding items,
characterized in that
the optical system comprises a spectrometer which comprises an optical diffraction grating for dividing the at least one polarized on-axis Raman beam and the at least one polarized off-axis Raman beam into an optical spectrum of spatially separated wavelength components, and
the spectrometer further comprises a focusing lens system for directing at least a portion of each spectrum to a detector, in particular a two-dimensional array detector, such as a two-dimensional CCD detector.

Item 11: The apparatus in accordance with any one of the items 5 to 10,
characterized in that
the central polarization sensitive element and/or the peripheral polarization sensitive element are arranged in a spectrometer of the optical system, in particular between a collimating lens system and an optical diffraction grating of the spectrometer, or
the central polarization sensitive element and/or the peripheral polarization sensitive element are arranged between an objective and an entrance slit of a spectrometer of the optical system.

Item 12: The apparatus in accordance with any one of the preceding items,
characterized in that
a laser beam delivery optical system is configured to provide polarized laser beams, preferably three laser beams, to the sample,
wherein the laser beams are generated from one or more lasers,
wherein, preferably, each laser provides laser light at a defined wavelength.

Item 13: A device, in particular for use in an apparatus in accordance with any one of the preceding items, the device comprising:
a central polarization sensitive element comprising a central polarizing beam splitter, in particular a Wollaston prism, and/or an analyzer,
at least one peripheral polarization sensitive element comprising a peripheral polarizing beam splitter, in particular a Wollaston prism, and/or an analyzer, and
the optical axis of the peripheral polarization sensitive element is arranged in a radial direction at a distance and in parallel to the optical axis of the central polarization sensitive element.

Item 14: A method of determining Euler angles for a point on a sample, the method comprising:
providing estimated Euler angles,
(a) providing at least one measured on-axis intensity and at least one measured off-axis intensity obtained from polarized Raman spectroscopy carried out on the point of the sample, in particularly by use of an apparatus in accordance with any one of the items 1 to 12,
(b) calculating at least one on-axis intensity and at least one off-axis intensity, preferably by using a Raman tensor associated with a crystal structure of the sample,
(c) calculating correction values for the estimated Euler angles based on the at least one measured on-axis intensity, the at least one measured off-axis intensity, the at least one calculated on-axis intensity and the at least one calculated off-axis intensity, and
(d) determining corrected Euler angles based on the estimated Euler angles and the correction values,
(e) wherein steps (b) to (d) are carried out iteratively.

Item 15: The method of item 14, further comprising
applying a normalization to the at least one measured on-axis intensity and the at least one measured off-axis intensity, thereby determining at least one normalized measured on-axis intensity and at least one normalized measured off-axis intensity,
applying a normalization to the at least one calculated on-axis intensity and the at least one calculated off-axis intensity, thereby determining at least one normalized calculated on-axis intensity and at least one normalized calculated off-axis intensity, and calculating the correction values for the estimated Euler angles based on the at least one normalized measured on-axis intensity, the at least one normalized measured off-axis intensity, the at least one normalized calculated on-axis intensity and the at least one normalized calculated off-axis intensity.

Item 16: The method of item 14 or 15,
wherein a plurality of measured on-axis intensities and a plurality of off-axis intensities are provided, and whereon the measured on-axis intensities are grouped into at least one group, wherein the measured off-axis intensities are grouped into at least one group, wherein a group-specific normalization is applied to the intensities of an associated group.

Item 17: A method of determining Euler angles for a plurality of points on a sample, the method comprising:
calculating a plurality of intensities for the points of a predetermined group of detection channels, wherein, preferably, the intensities are calculated by use of a Raman tensor and preferably based on an estimated orientation map,
providing for the group of detection channels a plurality of measured intensities for the points,
calculating at least one correction coefficient for correcting the measured intensities based on the calculated plurality of intensities,
applying the at least one correction coefficient to the measured intensities, thereby obtaining, for the points, corrected measured intensities of the group of detection channels,
calculating Euler angles for the points based on the corrected measured intensities of the group of detection channels.

Item 18: The method of item 17, further comprising at least one of the following:
determining the orientation map for the points based on the calculated Euler angles,
applying a normalization to the calculated plurality of intensities, thereby obtaining normalized calculated plurality of intensities which are used instead of the calculated plurality of intensities for calculating the at least one correction coefficient,
using the plurality of measured intensities for determining the normalization,
calculating the at least one correction coefficient comprises determining for each point at least one correction coefficient and averaging over all points.

LIST OF REFERENCE SIGNS 11 sample
13 light source
15 laser beam
17 laser beam
19 laser beam
21 on-axis Raman beam
23 off-axis Raman beam
25 Wollaston analyzer unit
27 central polarizing beam splitter
29 analyzer
31 polarized on-axis Raman beam
33 polarized on-axis Raman beam
35 polarized off-axis Raman beam
37 spectrometer
39 CCD array detector
41 objective
43 focusing lens
45 slit
47 spectrometer
49 collimating lens
51 filter
53 diffracting grating
55 focusing lens system
57 scanning stage
59 laser
61 laser
63 polarizer
65 polarizer
67 laser beam
69 mirror
71 dichroic mirror
73 laser beam
75 mirror
77 dichroic mirror
79 microscope
81 first spectrometer
83 second spectrometer
85 third spectrometer
87 laser
89 laser beam
89$a$ laser beam
89$b$ laser beam
89$c$ laser beam
91 dichroic mirror
93 laser
95 laser
97 laser
99$a$ laser beam
99$b$ laser beam
99$c$ laser beam
101 spot
103 Wollaston prism
105 analyzer
107 mask
109 on-axis Raman beam
111 off-axis Raman beam
113 optical device
115 Wollaston prism
117 Wollaston prism

What is claimed is:

1. An apparatus for carrying out polarization resolved Raman spectroscopy on a crystalline or polycrystalline sample, the apparatus comprising:
at least one laser, configured to provide excitation radiation to a surface of the sample, and
an optical system which is configured to collect at least one off-axis Raman beam from Raman light scattered by the sample in response to exposing the surface to the excitation radiation,
the at least one off-axis Raman beam being scattered from the sample in a direction that is inclined with regard to an optical axis of an objective of the optical system for collecting the at least one off-axis Raman beam,
wherein the optical system comprises at least one polarizer device for generating at least one polarized off-axis Raman beam from the at least one off-axis Raman beam,
the optical system comprises at least one spectrometer for generating an optical spectrum from the at least one polarized off-axis Raman beam,
wherein the at least one off-axis Raman beam travels along a propagation direction in the optical system which is offset from a central optical axis of the polarizer device, and wherein an at least one on-axis Raman beam is collected or collectable in addition to the at least one off-axis Raman beam.

2. The apparatus of claim 1, wherein
the optical system is configured to simultaneously collect at least one on-axis Raman beam in addition to the at least one off-axis Raman beam,
the at least one on-axis Raman beam is scattered from the sample in a direction that is aligned with an optical axis of an objective of the optical system, the objective being configured to collect the at least one on-axis Raman beam,
the at least one polarizer device is further configured to generate at least one polarized on-axis Raman beam from the at least one on-axis Raman beam, and
the at least one spectrometer is configured to generate an optical spectrum from each of the at least one polarized on-axis Raman beam and the at least one polarized off-axis Raman beam.

3. The apparatus in accordance with claim 2, wherein the same objective is configured to collect both the at least one on-axis Raman beam and the at least one off-axis Raman beam.

4. The apparatus in accordance with claim 2, wherein the optical system comprises a first objective for collecting the at least one on-axis Raman beam and at least a second objective for collecting the at least one off-axis Raman beam.

5. The apparatus in accordance with claim 1, wherein the polarizer device comprises a central polarization sensitive element comprising a central polarizing beam splitter and/or an analyzer.

6. The apparatus in accordance with claim 5, wherein the central polarizing beam splitter is arranged such that the at least one on-axis Raman beam passes through the central polarizing beam splitter which splits the on-axis Raman beam into two polarized on-axis Raman beams, each of which has a defined polarization, and/or
a peripheral polarizing beam splitter is arranged such that at least one off-axis Raman beam passes through the peripheral polarizing beam splitter which splits the off-axis Raman beam into two polarized off-axis Raman beams, each of which has a defined polarization.

7. The apparatus in accordance with claim 5, wherein the analyzer of the central or peripheral polarization sensitive element is configured to generate a polarized on axis or off-axis Raman beam from a respective on-axis or off-axis beam.

8. The apparatus in accordance with claim 1, wherein the polarizer device comprises at least one peripheral polarization sensitive element comprising a peripheral polarizing beam splitter and/or an analyzer.

9. The apparatus in accordance with claim 1, wherein the optical system comprises at least one mask which provides a pinhole for the at least one off-axis Raman beam.

10. The apparatus in accordance with claim 1, wherein the spectrometer comprises an optical diffraction grating for dividing the at least one polarized off-axis Raman beam and into an optical spectrum of spatially separated wavelength components, and
the spectrometer further comprises a focusing lens system for directing at least a portion of each spectrum to a detector.

11. The apparatus in accordance with claim 1, wherein the polarizer device is arranged in the spectrometer of the optical system or
the polarizer device is arranged between the objective and an entrance slit of the spectrometer of the optical system.

12. The apparatus in accordance with claim 1, wherein a laser beam delivery optical system is configured to provide at least one polarized laser beams to the sample, and
the laser beams are generated from one or more lasers, wherein, each laser provides laser light at a defined wavelength.

13. An apparatus for carrying out polarization resolved Raman spectroscopy on a crystalline or polycrystalline sample, the apparatus comprising:
at least one laser, configured to provide excitation radiation to a surface of the sample, and
an optical system which is configured to collect at least one off-axis Raman beam from Raman light scattered by the sample in response to exposing the surface to the excitation radiation,
the at least one off-axis Raman beam being scattered from the sample in a direction that is inclined with regard to an optical axis of an objective of the optical system for collecting the at least one off-axis Raman beam,
wherein the optical system comprises at least one polarizer device for generating at least one polarized off-axis Raman beam from the at least one off-axis Raman beam,
the optical system comprises at least one spectrometer for generating an optical spectrum from the at least one polarized off-axis Raman beam,
wherein the optical system is configured to simultaneously collect at least one on-axis Raman beam in addition to the at least one off-axis Raman beam,
the at least one on-axis Raman beam is scattered from the sample in a direction that is aligned with an optical axis of an objective of the optical system, the objective being configured to collect the at least one on-axis Raman beam,
the at least one polarizer device is further configured to generate at least one polarized on-axis Raman beam from the at least one on-axis Raman beam, and
the at least one spectrometer is configured to generate an optical spectrum from each of the at least one polarized on-axis Raman beam and the at least one polarized off-axis Raman beam
wherein the optical system comprises a first objective for collecting the at least one on-axis Raman beam and at least a second objective for collecting the at least one off-axis Raman beam.

* * * * *